(12) United States Patent
Wen et al.

(10) Patent No.: US 12,124,496 B2
(45) Date of Patent: Oct. 22, 2024

(54) METHOD FOR DETERMINING ACADEMIC IMPACT, MEDIUM, AND ELECTRONIC DEVICE

(71) Applicant: Research Institute of Tsinghua University In Shenzhen, Shenzhen (CN)

(72) Inventors: Jiangtao Wen, Beijing (CN); Yuxing Han, Shenzhen (CN); Wenqi Ji, Beijing (CN); Xi Li, Beijing (CN); Yunlong Deng, Beijing (CN)

(73) Assignee: Research Institute of Tsinghua University In Shenzhen, Shenzhen (CN)

( * ) Notice: Subject to any disclaimer, the term of this patent is extended or adjusted under 35 U.S.C. 154(b) by 0 days.

(21) Appl. No.: 18/096,779

(22) Filed: Jan. 13, 2023

(65) Prior Publication Data
US 2023/0252066 A1    Aug. 10, 2023

Related U.S. Application Data

(60) Provisional application No. 63/300,197, filed on Jan. 17, 2022.

(51) Int. Cl.
*G06F 16/00* (2019.01)
*G06F 16/38* (2019.01)

(52) U.S. Cl.
CPC ................ *G06F 16/382* (2019.01)

(58) Field of Classification Search
CPC .................................................. G06F 16/382
See application file for complete search history.

(56) References Cited

U.S. PATENT DOCUMENTS

| 2004/0064438 | A1* | 4/2004 | Kostoff | ................ | G06F 16/35 |
| 2006/0149720 | A1* | 7/2006 | Dehlinger | ............. | G06F 16/313 |
| | | | | | 707/E17.084 |
| 2008/0275859 | A1* | 11/2008 | Griffith | ................ | G06F 16/355 |

(Continued)

FOREIGN PATENT DOCUMENTS

| WO | WO-2008040007 A2 * | 4/2008 | ......... G06F 16/3326 |
| WO | WO-2012027122 A1 * | 3/2012 | ......... G06F 16/2468 |

OTHER PUBLICATIONS

Amjad Abu-Jbara and Dragomir Radev. 2012. Reference scope identification in citing sentences. In Proceedings of the 2012 Conference of the North American Chapter of the Association for Computational Linguistics: Human Language Technologies. 80-90.

(Continued)

*Primary Examiner* — Syed H Hasan
(74) *Attorney, Agent, or Firm* — Dilworth IP, LLC

(57) ABSTRACT

A method for determining an academic impact, including: pre-processing a citing paper to obtain pre-processed data; determining a category of an impact, on the citing paper, of each reference paper and ranking of contribution, to the citing paper, of each reference paper, according to the pre-processed data; determining a local influential factor, on the citing paper, of each reference paper, according to the category of the impact and the ranking of the contribution of each reference paper; and determining a global influential factor of each reference paper according to a global influential factor of the citing paper and the local influential factor.

17 Claims, 4 Drawing Sheets

(56) References Cited

U.S. PATENT DOCUMENTS

| | | | | |
|---|---|---|---|---|
| 2012/0072422 | A1* | 3/2012 | Rollins | G06F 16/24 |
| | | | | 707/E17.089 |
| 2012/0284248 | A9* | 11/2012 | Ghosh | G06F 16/951 |
| | | | | 707/706 |
| 2013/0144605 | A1* | 6/2013 | Brager | G06F 16/30 |
| | | | | 704/9 |
| 2016/0335257 | A1* | 11/2016 | Janssens | G06F 16/382 |
| 2016/0344828 | A1* | 11/2016 | Häusler | H04L 67/1044 |
| 2019/0213221 | A1* | 7/2019 | Zholudev | H04L 67/1044 |
| 2024/0037375 | A1* | 2/2024 | Wang | G06F 16/345 |

OTHER PUBLICATIONS

Xuefeng Bai, Pengbo Liu, and Yue Zhang. 2021. Investigating Typed Syntactic Dependencies for Targeted Sentiment Classification Using Graph Attention Neural Network. IEEE/ACM Trans. Audio, Speech and Lang. Proc. 29 (Jan. 2021), 503-514. https://doi.org/10.1109/TASLP.2020.3042009.

Carl T. Bergstrom. 2007. Eigenfactor Measuring the value and prestige of scholarly journals. College & Research Libraries News 68 (2007), 314-316.

Christopher J. C. Burges. 2010. From RankNet to LambdaRank to LambdaMART: An Overview., 1-19.

Christopher J. C. Burges, Robert J. Ragno, and Quoc V. Le. 2006. Learning to Rank with Nonsmooth Cost Functions. In NIPS.

Bilal Hayat Butt, Muhammad Rafi, Arsal Jamal, Raja Sami Ur Rehman, Syed Muhammad Zubair Alam, and Muhammad Bilal Alam. 2015. Classification of Research Citations (CRC). In CLBib@ISSI.

Guimin Chen, Yuanhe Tian, and Yan Song. 2020. Joint Aspect Extraction and Sentiment Analysis with Directional Graph Convolutional Networks. In Proceedings of the 28th International Conference on Computational Linguistics. International Committee on Computational Linguistics, Barcelona, Spain (Online), 272-279. https://doi.org/10.18653/v1/2020.coling-main.24.

Johan S. G. Chu and James A. Evans. 2021. Slowed canonical progress in large fields of science. Proceedings of the National Academy of Sciences of the United States of America 118 (2021).

Arman Cohan, Waleed Ammar, Madeleine van Zuylen, and Field Cady. 2019. Structural Scaffolds for Citation Intent Classification in Scientific Publications. ArXiv abs/1904.01608 (2019).

Corinna Cortes and Neil Lawrence. 2021. Inconsistency in Conference Peer Review: Revisiting the 2014 NeurIPS Experiment. ArXiv abs/2109.09774 (2021).

Jacob Devlin, Ming-Wei Chang, Kenton Lee, and Kristina Toutanova. 2019. BERT: Pre-training of Deep Bidirectional Transformers for Language Understanding. ArXiv abs/1810.04805 (2019).

Leo Egghe. 2006. Theory and practise of the g-index. Scientometrics 69 (2006), 131-152.

Besnik Fetahu, Katja Markert, and Avishek Anand. 2017. Fine Grained Citation Span for References in Wikipedia. In Proceedings of the 2017 Conference on Empirical Methods in Natural Language Processing. Association for Computational Linguistics, Copenhagen, Denmark, 1990-1999. https://doi.org/10.18653/v1/D17-1212.

Zhengjie Gao, Ao Feng, Xinyu Song, and Xi Wu. 2019. Target-Dependent Sentiment Classification With BERT. IEEE Access 7 (2019), 154290-154299.

Borja Gonzalez-Pereira, Vicente Guerrero-Bote, and Felix Moya-Anegon. 2009. The SJR indicator: A new indicator of journals' scientific prestige. arXiv:0912.4141 [cs.DL].

Kaiming He, Xiangyu Zhang, Shaoqing Ren, and Jian Sun. 2015. Deep Residual Learning for Image Recognition. arXiv:1512.03385 [cs.CV].

Jorge E. Hirsch. 2005. An index to quantify an individual's scientific research output. Proc. Natl. Acad. Sci. USA 102 (2005), 16569-16572.

Mickel Hoang, Oskar Alija Bihorac, and Jacobo Rouces. 2019. Aspect-Based Sentiment Analysis using BERT. In Nodalida.

Minghao Hu, Yuxing Peng, Zhen Huang, Dongsheng Li, and Yiwei Lv. 2019. Open-Domain Targeted Sentiment Analysis via Span-Based Extraction and Classification. In Proceedings of the 57th Annual Meeting of the Association for Computational Linguistics. Association for Computational Linguistics, Florence, Italy, 537-546. https://doi.org/10.18653/v1/P19-1051.

David Jurgens, Srijan Kumar, Raine Hoover, Daniel A. McFarland, and Dan Jurafsky. 2016. Citation Classification for Behavioral Analysis of a Scientific Field. ArXiv abs/1609.00435 (2016).

Dain Kaplan, Ryu Iida, and Takenobu Tokunaga. 2009. Automatic extraction of citation contexts for research paper summarization: A coreference-chain based approach. In Proceedings of the 2009 Workshop on Text and Citation Analysis for Scholarly Digital Libraries (NLPIR4DL). 88-95.

Dain Kaplan, Takenobu Tokunaga, and Simone Teufel. 2016. Citation Block Determination Using Textual Coherence. Journal of Information Processing 24, 3 (2016), 540-553. https://doi.org/10.2197/ipsjjip.24.540.

Haixia Liu. 2017. Sentiment Analysis of Citations Using Word2vec. ArXiv abs/1704.00177 (2017).

Huaishao Luo, Lei Ji, Tianrui Li, Daxin Jiang, and Nan Duan. 2020. Grace: Gradient Harmonized and Cascaded Labeling for Aspect-based Sentiment Analysis. In Findings of the Association for Computational Linguistics: EMNLP 2020. Association for Computational Linguistics, Online, 54-64. https://doi.org/10.18653/v1/2020.findings-emnlp.6.

Shutian Ma, Jin Xu, and Chengzhi Zhang. 2018. Automatic Identification of Cited Text Spans: A Multi-Classifier Approach over Imbalanced Dataset. Scientometrics 116, 2 (Aug. 2018), 1303-1330. https://doi.org/10.1007/s11192-018-2754-2.

Jessica L. Milstead. 1980. Citation Indexing—Its Theory and Application in Science, Technology and Humanities. Wiley, Oxford (1979), 274, $15.95. Information Processing and Management 16 (1980).

Henk F. Moed. 2010. Measuring contextual citation impact of scientific journals. Journal of Informetrics 4, 3 (2010), 265-277. https://doi.org/10.1016/j.joi.2010.01.002.

Lawrence Page, Sergey Brin, Rajeev Motwani, and Terry Winograd. 1999. The PageRank Citation Ranking: Bringing Order to the Web. Technical Report 1999-66. Stanford InfoLab. http://ilpubs.stanford.edu:8090/422/ Previous number =SIDL-WP-1999-0120.

Vahed Qazvinian and Dragomir Radev. 2010. Identifying Non-Explicit Citing Sentences for Citation-Based Summarization . . . In Proceedings of the 48th annual meeting of the association for computational linguistics. 555-564.

Sebastian Ruder, Parsa Ghaffari, and John G. Breslin. 2016. A Hierarchical Model of Reviews for Aspect-based Sentiment Analysis. In EMNLP.

Per O. Seglen. 1997. Why the impact factor of journals should not be used for evaluating research. BMJ 314 (1997), 497.

Chi Sun, Luyao Huang, and Xipeng Qiu. 2019. Utilizing BERT for Aspect-Based Sentiment Analysis via Constructing Auxiliary Sentence. In NAACL.

Simone Teufel, Advaith Siddharthan, and Dan Tidhar. 2006. Automatic classification of citation function. In EMNLP.

Maria Mihaela Trusca, Daan Wassenberg, Flavius Frasincar, and Rommert Dekker. 2020. A Hybrid Approach for Aspect-Based Sentiment Analysis Using Deep Contextual Word Embeddings and Hierarchical Attention. In ICWE.

Marco Valenzuela, Vu A. Ha, and Oren Etzioni. 2015. Identifying Meaningful Citations. In AAAI Workshop: Scholarly Big Data.

Olaf Wallaart and Flavius Frasincar. 2019. A Hybrid Approach for Aspect-Based Sentiment Analysis Using a Lexicalized Domain Ontology and Attentional Neural Models. In ESWC.

Hongning Wang, Yue Lu, and ChengXiang Zhai. 2010. Latent aspect rating analysis on review text data: a rating regression approach. Proceedings of the $16^{th}$ ACM SIGKDD international conference on Knowledge discovery and data mining (2010).

Hu Xu, Bing Liu, Lei Shu, and Philip S. Yu. 2019. BERT Post-Training for Review Reading Comprehension and Aspect-based Sentiment Analysis. In NAACL.

(56) References Cited

OTHER PUBLICATIONS

Chrysoula Zerva, Minh quoc Nghiem, Nhung T. H. Nguyen, and Sophia Ananiadou. 2020. Cited text span identification for scientific summarisation using pretrained encoders. Scientometrics (May 7, 2020). https://doi.org/10.1007/s11192-020-03455-z.

* cited by examiner

METHOD FOR DETERMINING ACADEMIC IMPACT, MEDIUM, AND ELECTRONIC DEVICE

CROSS-REFERENCE TO RELATED APPLICATION

The present application claims the benefit of priority to U.S. Provisional Application No. 63/300,197 filed on Jan. 17, 2022, the contents of which are incorporated herein by reference in their entireties for all purposes.

BACKGROUND

Currently, the number of papers published each year has increased dramatically. However, most existing evaluation metrics for academic impact only focus on the quantity of papers, which leads to the failure to effectively evaluate the true academic impacts of scholars and publications.

SUMMARY

The disclosure relates to the field of electronic technology, and in particular to a method for determining an academic impact, a medium, and an electronic device.

There is provided a method for determining an academic impact according to an example of the disclosure. The method includes: pre-processing a citing paper to obtain pre-processed data, where the citing paper refers to a paper citing a reference, and the pre-processed data include reference numbers of reference papers in a reference list of the citing paper, titles of the reference papers, authors of the reference papers, publication years of the reference papers, overlap between the authors of the reference papers and authors of the citing paper, identifier of a sentence in the citing paper, category of a section in the citing paper, the number of citations of the reference papers in the citing paper, texts of sentences containing the reference numbers in the citing paper, related sentences previous to the sentences containing the reference numbers, related sentences behind the sentences containing the reference numbers, and sentiment of the citing paper towards the reference papers; determining a category of an impact, on the citing paper, of each reference paper and ranking of contribution, to the citing paper, of each reference paper, according to the pre-processed data; determining a local influential factor, on the citing paper, of each reference paper, according to the category of the impact and the ranking of the contribution of each reference paper; and determining a global influential factor of each reference paper according to a global influential factor of the citing paper and the local influential factor.

The disclosure further provides a non-transitory computer-readable storage medium storing a computer program thereon, where the computer program implements steps of the method of any one of the disclosure when executed by a processor.

The disclosure further provides an electronic device, including: a memory storing a computer program thereon; and a processor configured to execute the computer program in the memory, to implement steps of the method of any one of the disclosure.

Other features and advantages of the disclosure will be described in detail in the following particular examples.

BRIEF DESCRIPTION OF THE DRAWINGS

The accompanying drawings, which are used for providing further understanding of the disclosure and constitute part of the description, serve to explain the disclosure along with the following examples instead of limiting the disclosure. In the accompanying drawings.

DETAILED DESCRIPTION

The examples of the disclosure are described in detail below in combination with the accompanying drawings. It should be understood that the examples described are configured to describe and explain the disclosure and are not intended to limit the disclosure.

It should be noted that all action for obtaining signals, information or data in the disclosure are taken on the premise of complying with corresponding data protection laws and policies of the local country and obtaining authorization from the corresponding device owner.

Figure 1:
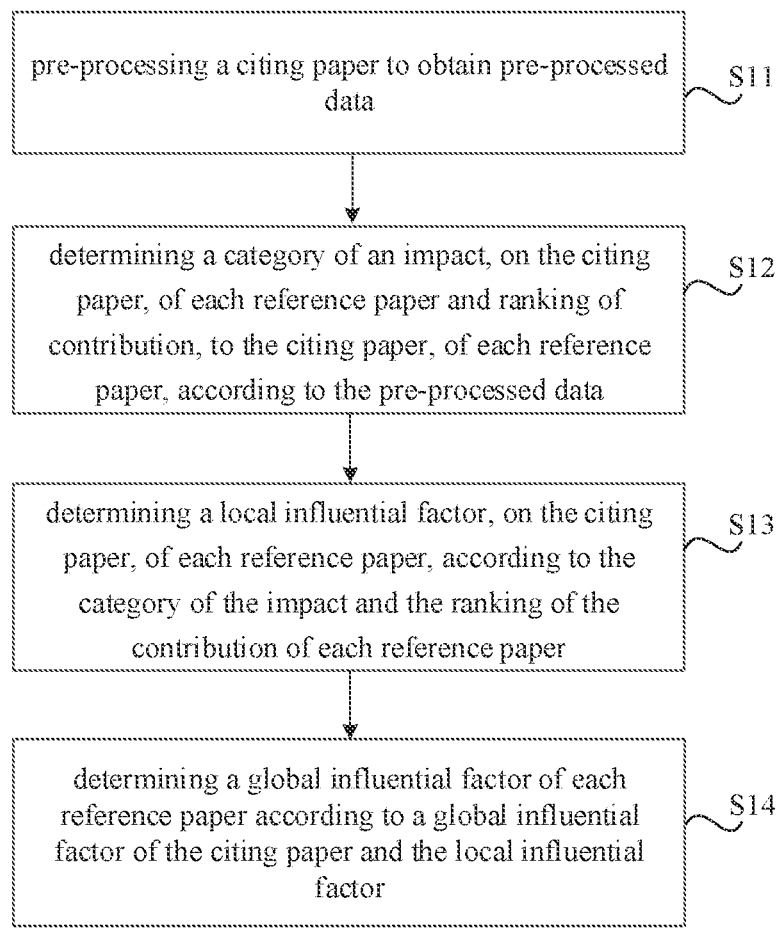
FIG. 1 is a flowchart of a method for determining an academic impact according to an example of the disclosure.

FIG. 1 is a flowchart of a method for determining an academic impact according to an example of the disclosure. As shown in FIG. 1, the method may include steps S11-S14.

Step S11 includes pre-processing a citing paper to obtain pre-processed data.

In some examples, the citing paper refers to a paper citing a reference. For example, if paper A cites papers B and C, paper A is called a citing paper, and papers B and C are called reference papers or cited papers.

The citing paper may be in a format of character string, so as to be pre-processed conveniently. If not in the format of character string, the citing paper may be converted into one in the format of character string.

Table 1 shows a schematic listing of the pre-processed data.

TABLE 1

Preprocessed data

| Name | Definition | Range |
| --- | --- | --- |
| cit_id | Reference number of reference paper in reference list of citing paper | Positive integer |
| cit_title | Title of reference paper | Character string |
| cit_author | Author of reference paper | List of authors |
| cit_year | Publication year of reference paper | Year |
| au_overlap | Overlap between authors of reference paper and authors of citing paper | [0, 1] |
| sent_id | Identifiers of sentences in citing paper | Natural number |
| sec_id | Category of section in citing paper | 0: introduction of related work; 1: main body; 2: conclusion |
| n_cit | Number of citations of reference paper in citing paper | Natural number |
| cit_text | Text of sentence containing cit_id inciting paper | Character string |
| context_a | Related sentences previous to cit_text | Character string |

TABLE 1-continued

Preprocessed data

| Name | Definition | Range |
| --- | --- | --- |
| context_b | Related sentences behind cit_text | Character string |
| sen_label | Sentiment of polarity citing paper towards cit_id | −1: negative sentiment; 0: neutral sentiment; 1: positive sentiment |

In Table 1, value range [0, 1] of au_overlap refers to an overlap degree between the authors of the reference papers and the authors of the citing paper. If the value of au_overlap is 0, it indicates that the authors of the reference paper do not overlap with the authors of the citing paper. If the value of au_overlap is 1, it indicates that the authors of the reference paper completely overlap with the authors of the citing paper. If the value of au_overlap is between 0 and 1, it indicates that the authors of the reference paper partially overlap with the authors of the citing paper. For example, if the citing paper has five authors, and two of authors of a certain reference paper in the reference list are the same as those of the citing paper, the overlap degree between the authors of this reference paper and the authors of the citing paper is 2/5=0.4.

In Table 1, "Introduction to related work" in "category of section in citing paper" generally refers to an introduction section or other background-related citations in the citing paper, "main body" includes sections of methodology, experiments etc. of the citing paper, and "conclusion" refers to a conclusion and other parts of the citing paper.

In Table 1, "sentiment of polarity citing paper towards cit_id" refers to sentiment of polarity the citing paper towards the reference papers.

Figure 2:
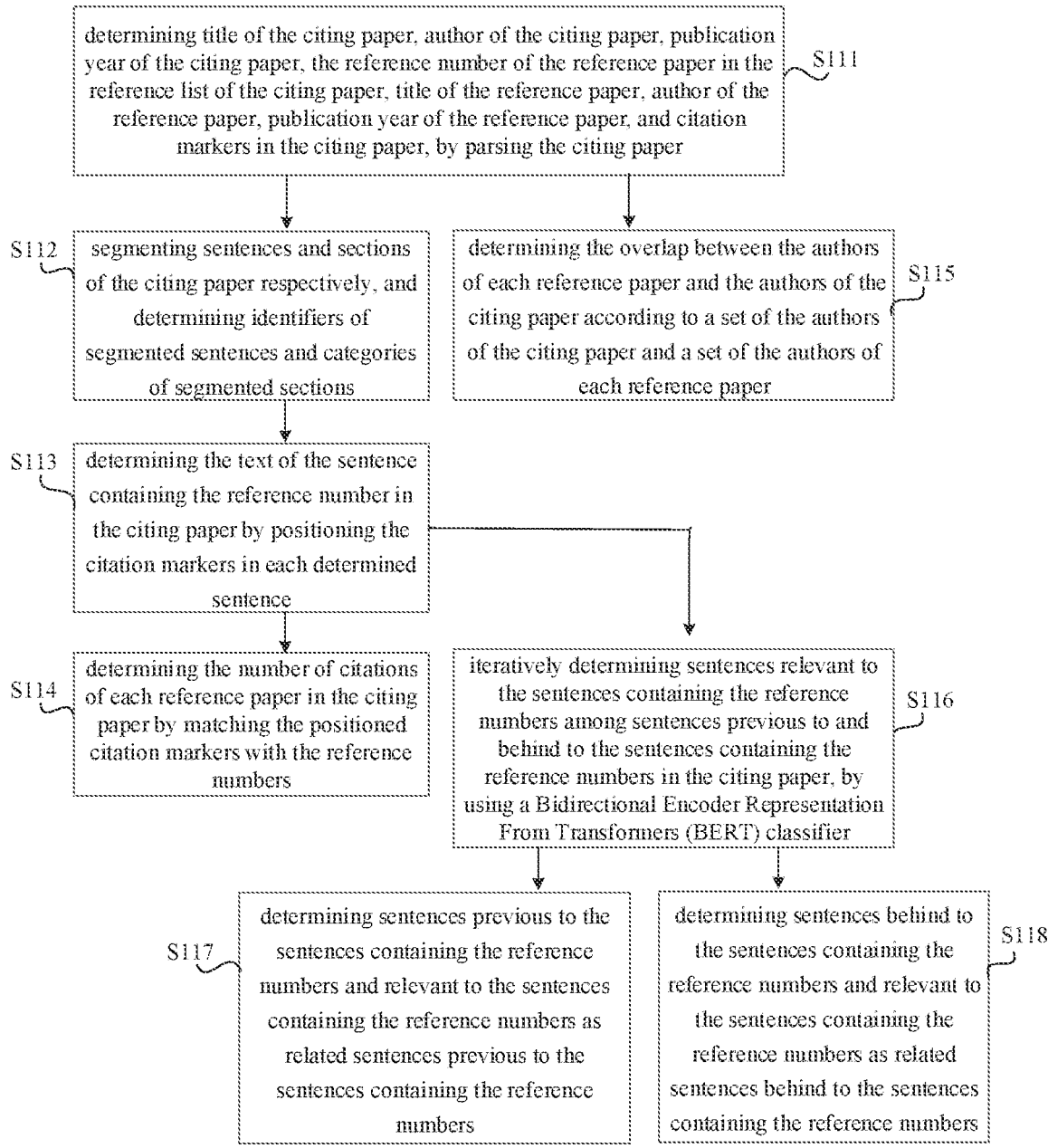
FIG. 2 shows a schematic flowchart of pre-processing a citing paper according to an example of the disclosure.

FIG. 2 shows a schematic flowchart of pre-processing the citing paper according to an example of the disclosure. The flowchart may include steps S111 to S115.

As shown in FIG. 2, step S111 includes determining title of the citing paper, author of the citing paper, publication year of the citing paper, the reference numbers of the reference papers in the reference list of the citing paper, titles of the reference papers, authors of the reference papers, publication years of the reference papers, and citation markers in the citing paper, by parsing the citing paper. The citation markers refer to the reference numbers appearing in the citation, and the citation refers to a text citing the reference papers in the citing paper.

In some examples, the citing paper may be parsed through flari (see Johan S. G. Chu and James A. Evans, "Slowed canonical progress in large fields of science", Proceedings of the National Academy of Sciences of the United States of America, 2021).

Step S112 includes segmenting sentences and sections of the citing paper respectively, and determining identifiers of segmented sentences and categories of segmented sections.

In some examples, regular expression matching may be used to segment the sentences of the citing paper, and the identifiers of the segmented sentences may be determined according to appearing order of the segmented sentences. For example, after the sentences of the citing paper are segmented by using the regular expression matching, an identifier of a sentence with an appearing order of 2 is determined as 2, and the sentence may be labeled with the identifier of the sentence.

In some examples, the sections of the citing paper may be segmented and the categories of the segmented sections may be determined, based on keywords match. For example, keywords may include introduction, methodology, experiment, conclusion, etc. A section title in the citing paper may match these keywords to determine the category of each section in the citing paper. The categories of the sections have been described in Table 1 and will not be repeated here.

Step S113 includes determining the text of the sentence containing the reference numbers in the citing paper by positioning the citation markers in each determined sentence.

That is, by positioning the citation markers, the sentences containing the citation markers in citing paper may be determined, and then the texts of these sentences may be determined.

Step S114 includes determining the number of citations of each reference paper in the citing paper by matching the positioned citation markers with the reference numbers.

For example, if the citation markers in N sentences all match the same reference number, it may be determined that the reference paper corresponding to the reference number has been cited in the citing paper N times.

Step S115 includes determining the overlap between the authors of each reference paper and the authors of the citing paper according to a set of the authors of the citing paper and a set of the authors of each reference paper.

In some examples, the overlap between the authors of each reference paper and the authors of the citing paper may be calculated through the following formula:

$$\mathrm{au\_overlap} = 2 \times \frac{A \cap B}{|A| + |B|} \qquad (1)$$

where A is the set of the authors of the citing paper and B is the set of the authors of the reference paper.

With continued reference to FIG. 2, the flow of pre-processing the citing paper may further include the following steps S116 to S118.

Step S116 includes iteratively determining sentences relevant to the sentences containing the reference numbers among sentences previous to and behind the sentences containing the reference numbers in the citing paper, by using a Bidirectional Encoder Representation From Transformers (BERT) classifier. If a relevance degree of objects discussed in two sentences is high, for example, the same object is discussed, or the relevance degree between the discussed objects is greater than a preset threshold, the two sentences may be deemed relevant, otherwise the two sentences may be deemed irrelevant. In consideration of the relevance between the two sentences before and after, the range of the related sentences of a cited document may be expanded, thus improving the evaluation accuracy for the work of the cited paper.

The BERT classifier is a classifier trained through a manually annotated data set containing sentence pairs labeled as "related" or "irrelevant" (for example, containing over 1000 sentence pairs labeled as "related" or "irrelevant"), and each sentence pair is generated from a single academic paper. The BERT classifier trained through the manually annotated dataset may achieve the accuracy up to 94.5%.

Step S117 includes determining sentences previous to the sentences containing the reference numbers and relevant to the sentences containing the reference numbers as related sentences previous to the sentences containing the reference numbers.

Step S118 includes determining sentences behind the sentences containing the reference numbers and relevant to the sentences containing the reference numbers as related sentences behind the sentences containing the reference numbers.

For example, in order to obtain the context of the sentence containing the reference number (that is, cit_context), the BERT classifier described above may be iteratively applied on sentence pair (S[sent_id−i], S[sent_id]), where S represents a list of all sentences of the citing paper, sent_id refers to the sentence containing the reference number, i increases from 1. Once the BERT classifier reports an "irrelevant" sentence pair, the iteration is aborted, S [sent_id−i:sent_id] is used as context_a. Another criterion for aborting the iteration is that S[sent_id−i] should always be positioned in the same paragraph as S[sent_id]. A similar iterative process is performed on sentence pair (S [sent_id+i], S[sent_id]) to obtain context_b.

Moreover, the "sen_label", that is, the sentiment of polarity the citing paper towards cit_id may be determined by using a pre-trained classifier. For example, samples pre-labeled as positive sentiment, neutral sentiment, and negative sentiment may be input into the classifier for training. After training, the classifier may be configured to classify the sentiment of polarity the citing paper towards the reference papers.

All the pre-processed data shown in Table 1 may be obtained through the technical solution of FIG. 2.

After all the pre-processed data are obtained, step S12 in FIG. 1 may be performed. Step S12 includes determining a category of an impact, on the citing paper, of each reference paper and ranking of contribution, to the citing paper, of each reference paper, according to the pre-processed data.

In some examples, the category of the impact, on the citing paper, of each reference paper may be determined by using a pre-trained classifier according to the pre-processed data.

For example, it is assumed that a reference paper is cited in 5 places of the citing paper in total, categories of impacts of the 5 citations may be determined separately by the pre-trained classifier. Then the categories of the impacts of the 5 citations are comprehensively considered (such as weighted average or subjected to other processing) to obtain the category of the impact, on the citing paper, of the reference paper.

For another example, in the process of determining the category of the impact, the sentiment of polarity the citing paper towards the reference paper may also be taken into consideration. For example, for a reference paper, among citations of the reference paper, the more the citations having positive polarity, the greater the impact, on the citing paper, of the reference paper; on the contrary, the more the citations having negative polarity, the smaller the impact, on the citing paper, of the reference paper.

The pre-trained classifier may be a Naive Bayesian classifier. The category of the impact may include the citing paper being highly impacted by the reference paper (for example, if the reference paper inspires the citing paper, the citing paper is deemed to be highly impacted by the reference paper), the citing paper using work in the reference paper, the citing paper and the reference paper being related work, and the citing paper having negative sentiment towards the reference paper (for example, the citing paper refutes the reference paper).

In some examples, a pre-trained ranking model may be configured to predict the ranking of the contribution, to the citing paper, of the reference paper. The pre-trained ranking model may be based on LambdaMART. LambdaMART is a boosted tree version of LambdaRank, which solves the gradient problem of a nonsmooth cost function used in the ranking model.

How to predict the ranking of the contribution, to the citing paper, of reference paper is described below. Let $C_{ij}$ represents a jth citation among citations on an ith reference paper in the citing paper. A matrix in the shape of ($\Sigma_i$ n_cit$_i$, 4) is input into the pre-trained ranking model, where n_cit$_i$ represents the number of citations of the ith reference paper in the citing paper, and 4 represents a feature quaternion (au_overlap, n_cit, cit_word, sen_label). cit_word is calculated as the total number of words in context_a+cite_text+context_b. Then the pre-trained ranking model calculates a score $s_{ij}$ for each citation $C_{ij}$ separately, and averages scores of all the citations on the ith reference paper in the citing paper to obtain a score $s_i=1/n\_cit_i \Sigma_j s_{ij}$ of the ith reference paper. The score of the reference paper is embodied as the contribution, to the citing paper, of the reference paper. Thus, each reference paper may be ranked according to the score of each reference paper, and the ranking of the contribution, to the citing paper, of each reference paper may be obtained.

In some examples, labels may be configured to represent different categories of impacts, as shown in Table 2, where the greater the label value, the greater the contribution to the citing paper.

TABLE 2

| Category of impact | |
| --- | --- |
| Label | Description |
| 3 | extending the reference paper; highly impacted by the reference paper |
| 2 | using the work in the reference paper |
| 1 | the citing paper and the reference paper are related work |
| 0 | the citing paper has negative sentiment towards the reference paper |

Step S13 includes determining a local influential factor, on the citing paper, of each reference paper, according to the category of the impact and the ranking of the contribution of each reference paper.

In some examples, contribution value of each reference paper is calculated according to the category of the impact and the ranking of the contribution of each reference paper, and the local influential factor of each reference paper is obtained by normalizing the contribution value of each reference paper to [0, 1]. That is, the contribution value is determined according to the category of the impact and the ranking of the contribution of the reference paper. For example, if the higher the category of the impact, on the citing paper, of a reference paper and the higher the ranking of the contribution of the reference paper are, the higher the contribution value, to the citing paper, of the reference paper is. For example, a pre-trained convolutional neural network may be configured to determine the contribution value, to the citing paper, of each reference paper.

Step S14 includes determining a global influential factor of each reference paper according to a global influential factor of the citing paper and the local influential factor.

In some examples, let A represents a citing paper in which a global influential factor $AF_A$ is initialized to 1, $R_A$ represents all reference papers of A, and $IF_A^i$ represents a local influential factor, on A, of the reference paper of A, for example, $IF_{Ai}^i \in [-1,1]$ represents a local influential factor, on A, of the reference paper i of A. Let $C_A$ represents a set of all citing papers citing A, for $j \in C_A$, $IF_{jA}^i \in [-1,1]$ represents the local influential factor, on j, of A. Thus, the global influential factor of A is updated to:

$$AF_A = \Sigma_{j \in C_A} AF_j \times IF_{jA}^i \quad (2)$$

That is, the global influential factor of A is the sum of products of the local influential factors, on the citing papers citing A, of A and the global influential factor of the citing papers citing A.

Figure 3:
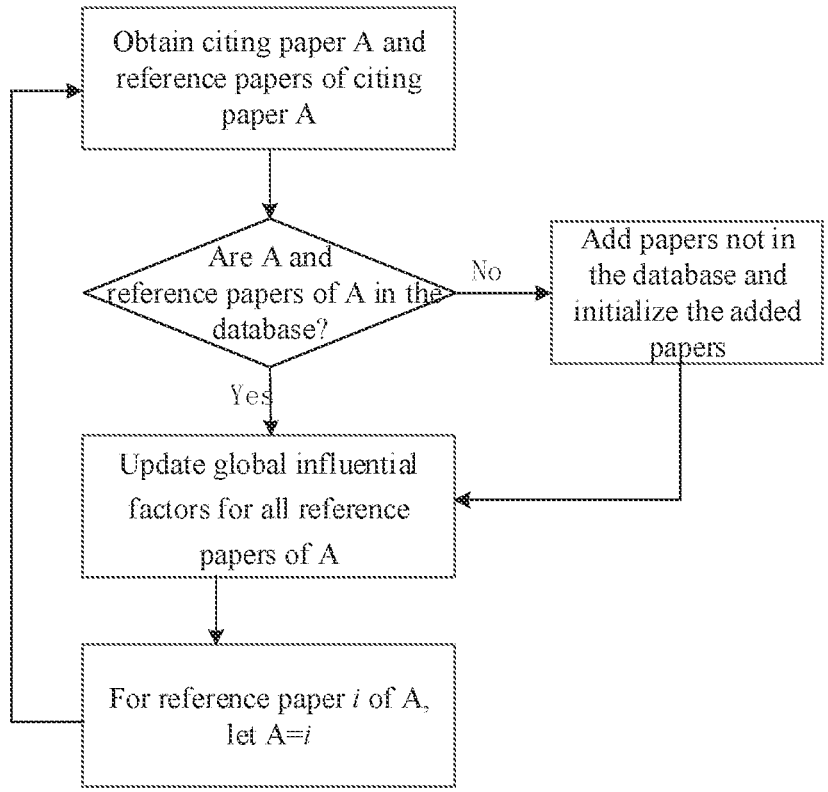
FIG. 3 illustratively shows a schematic diagram of a propagation mode of global influential factor according to an example of the disclosure.

By using the propagation and updating modes of the global influential factor described above, global influential factors of all papers in a database may be obtained. FIG. 3 illustratively shows a schematic diagram of propagation manner of the global influential factor according to an example of the disclosure. That is, first, a paper in the database is taken as a citing paper, and global influential factors of all reference papers of the citing paper are updated. Then the reference papers of the citing paper are taken as new citing papers, and global influential factors of reference papers of the new citing paper continue to be updated. The propagation is performed in this way, so that the global influential factors of all the papers in the database may be updated.

Through the technical solution described above, sentiment polarity, to the reference paper, of the citing paper is taken into consideration when determining the global influential factor, so that the true academic value of the reference paper may be effectively evaluated.

In some examples, the method according to the example of the disclosure further includes: determining contribution, of a scholar of which an academic impact is to be analyzed, to each paper published by the scholar; and determining academic influential factor of the scholar based on the contribution, to each paper published by the scholar, of the scholar and global influential factor of each paper.

For example, for an author a who has published a set of papers $P_a$, whose contribution to a paper $i \in P_a$ is $C_{ia} \in [0,1]$, an academic influential factor of the author a is:

$$AF_a = \Sigma_{i \in P_a} C_{ia} \times AF_i \quad (3)$$

Moreover, for paper A and all its N authors, $$\sum_{i}^{N} C_{Ai} \equiv 1,$$

where $C_{Ai}$ represents contribution, to paper A, of the ith author among the N authors. The contributions $C_{ia}$ and $C_{Ai}$ may be the contribution values obtained by normalizing to [0, 1] as described above.

Through the technical solution described above, an academic impact of a scholar may be effectively evaluated.

Figure 4:
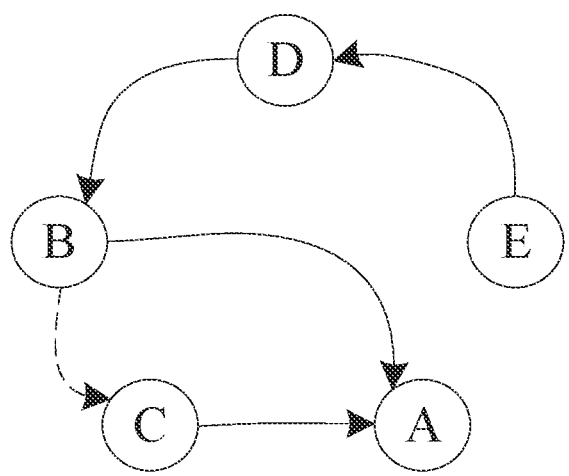
FIG. 4 illustratively shows a primary citation and a secondary citation.

Next, some scholars and their publications are selected as targets, and the advantages and disadvantages of the method for determining an academic impact according to the example of the disclosure and a method for determining an academic impact in the related art are compared on the basis of a relation between a primary citation and a secondary citation. FIG. 4 illustratively shows a primary citation and a secondary citation. As shown in FIG. 4, for paper A: since papers B and C directly cite paper A, papers B and C are called primary citing papers; since papers D and E both indirectly cite paper A, paper D is called a secondary citing paper, and paper E is called a tertiary citing paper.

Let Scholar Y denotes a certain scholar, and a difference in academic impact between scholar Y and Turing Award winner Pat. Hanrahan will be shown. It should be emphasized that Pat. Hanrahan is much more influential than scholar Y, not only because Pat. Hanrahan has won the Turing Award, but also based on reliable statistics of citations. For example, He et al. (see Kaiming He, Xiangyu Zhang, Shaoqing Ren, and Jian Sun, "Deep Residual Learning for Image Recognition", arXiv:1512.03385 [cs.CV], 2015) take one paper of scholar Y as a baseline that performs better than only one of 11 baselines. Table 3 lists the number of publications and the number of citations of scholar Y and Pat. Hanrahan. Table 4 shows evaluation results of scholar Y and Pat. Hanrahan through Aminer, Google Scholar, Semantic Scholar, and the method for determining an academic impact of the disclosure. Obviously, scholar Y is more productive than Pat. Hanrahan. However, these numbers covers up some significant truths that not all papers are equal influential and not all citations mean agreement with the cited papers. In Table 4, h represents h-index, g represents g-index, i10 represents i10-index, and HIC is the number of highly influential citations. H-index, also called index h, is proposed by Jorge E. Hirsch, and its definition is the number of papers with the number of citations higher than or equal to h. The g-index is defined as the largest number such that the top g articles received together at least $g^2$ citations. Google Scholar proposes the i10-index which is the number of publications cited at least 10 times. The h-index, the g-index, and the i10-index are all derived from citations and do not reveal the truth among the citations. Semantic Scholar uses support vector machine (SVM) with a radial basis function (RBF) kernel and random forest to classify citations into 4 categories: highly influential citations, background citations, method citations, and results citations. The features used by Semantic Scholar are the total number of direct citations, the number of direct citations per section, the total number of indirect citations, the number of indirect citations per section, author overlap, is considered helpful, citations appearing in tables and caption, 1/number of references, the number of paper citations/all citations, similarity between abstracts, PageRank, the total number of citing papers after transitive closure, and the field of the cited papers. XX papers citing scholar Y are collected from 78663 papers, and XX papers citing Patrick Hanrahan are collected from 56383 papers. Only utilizing the primary citing papers, global influential factors of scholar Y and Patrick Hanrahan are 0.40 and 0.52, respectively, through the method for determining the academic impact according to the example of the disclosure. Patrick Hanrahan's global influential factor is 30% higher than the global influential factor of scholar Y. While the evaluation results from Aminer, Google Scholar, and Semantic Scholar show that scholar Y is more productive and more influential than Patrick Hanrahan. The results show that the method for determining the academic impact according to the example of the disclosure may identify a true value of a paper or a scholar.

TABLE 3

Number of publications and number of citations of scholar Y and Hanrahan

| | Aminer | | Google Scholar | Semantic Scholar | |
|---|---|---|---|---|---|
| Scholar | Publication | Number of citation | Number of citation | Publication | Number of citation |
| Y | 1146 | 77903 | 78663 | 771 | 59679 |
| Hanrahan | 381 | 52214 | 50568 | 315 | 56383 |

TABLE 4

Evaluation results of scholar Y and Pat. Hanrahan

| Scholar | Aminer | | Google Scholar | | Semantic Scholar | | The disclosure |
|---|---|---|---|---|---|---|---|
| | h | g | h | I10 | h | HIC | |
| Y | 131 | 258 | 123 | 723 | 119 | 5843 | 0.4 |
| Hanrahan | 97 | 228 | 93 | 200 | 88 | 3741 | 0.52 |

Moreover, a series of experiments prove that the method for determining the academic impact according to an example of the disclosure is reasonable.

Firstly, the experiments prove that, given a set of reference papers within a paper, removing any one reference paper from the set of the reference papers won't change the related order of left reference papers. Each time a reference paper is removed, the left reference papers still keep related order.

Secondly, the experiments prove that the final score is stable and insensitive to propagating order under a certain paper pool. The strategy of the method for determining the academic impact according to the disclosure is to start from a default global influential factor of 1.0, traverses each paper, and successively updates the global influential factor. The experiments show that the final score of each paper remains the same regardless of the updating order.

Further, the experiments also prove that the method for determining the academic impact according to the example of the disclosure also satisfies the requirements of citation span. In the experiments, citation spans for about 345 citation sentences are annotated and used as a data set to train and test a baseline model. First, a text of each citation sentence is segmented into tokens through a tokenizer tool provided by SpaCy (see Besnik Fetahu, Katja Markert, and Avishek Anand, Fine Grained Citation Span for References in Wikipedia, Proceedings of the 2017 Conference on Empirical Methods in Natural Language Processing, Association for Computational Linguistics, Copenhagen, Denmark, 1990-1999, https://doi.org/10.18653/v1/D17-1212), and part-of-speech-tags and dependency labels are assigned to each token using tagger and parser tool. The features listed in Table 5 are then extracted as the input of the baseline model. SVM, Logistic Regression (LR) and conditional random field (CRF) are used for training. Training and testing are performed through 10-fold cross-validation. Table 6 lists precisions, recall rates, and F1 of the three models.

TABLE 5

Features for citation span

| Feature | Description |
|---|---|
| Distance | The distance (in words) between the word and the target citation. |
| Position | The feature takes a value of 1 if the word appears before the target citation, otherwise it is 0. |
| Segment | After splitting the sentence into segments by punctuation and coordination conjunctions, this feature takes the value 1 if the word occurs in the same segment with the target reference, and 0 otherwise. |
| pos_tag | The part of speech tag of the word, the word before, and the word after. |
| dTreeDistance | Length of the shortest dependency path (in the dependency parse tree) that connects the word to the target reference or its representative. |

TABLE 5-continued

Features for citation span

| Feature | Description |
|---|---|
| lca | The type of the node in the dependency parse tree that is the least common ancestor of the word and the target reference. |

TABLE 6

Results of three different models for citation span

| Model | Precision | Recall rate | F1 |
|---|---|---|---|
| SVM | 0.78 | 0.56 | 0.65 |
| LR | 0.68 | 0.67 | 0.67 |
| CRF | 0.65 | 0.64 | 0.64 |

Figure 5:
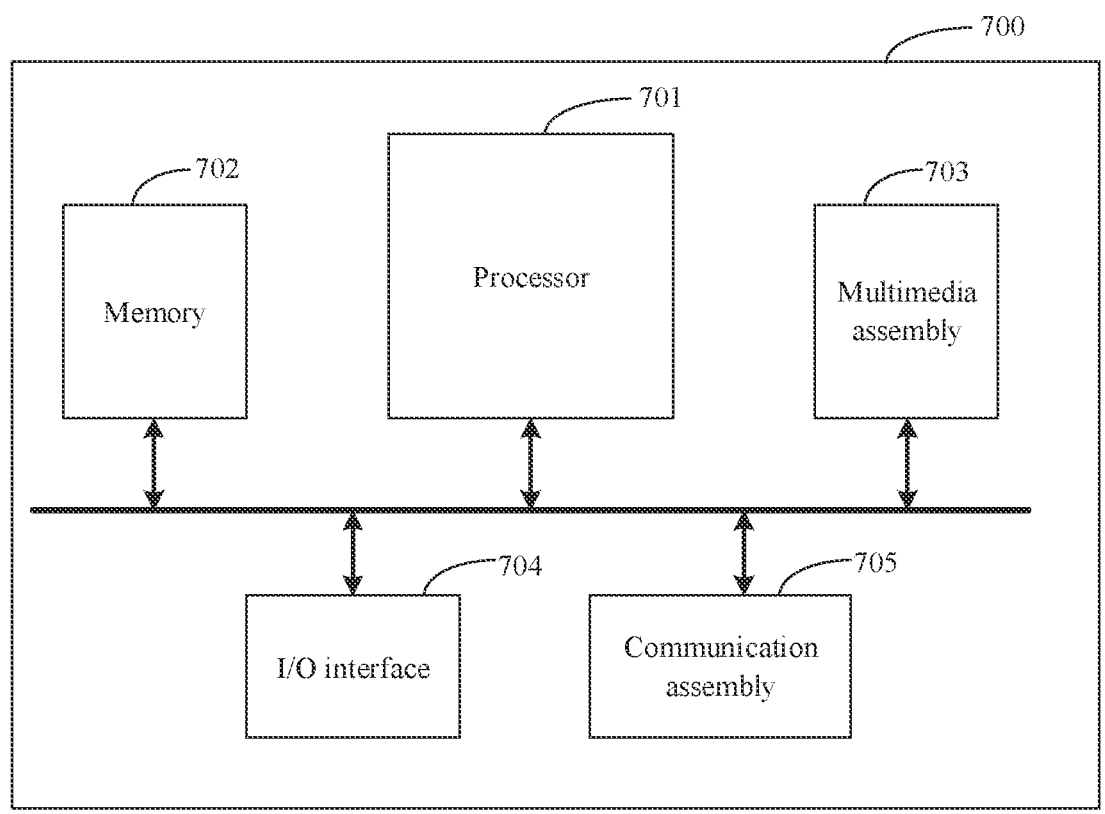
FIG. 5 is a block diagram of an electronic device shown according to an example.

FIG. 5 is a block diagram of an electronic device 700 shown according to an example. As shown in FIG. 5, the electronic device 700 may include: a processor 701 and a memory 702. The electronic device 700 may also include one or more of a multimedia assembly 703, an input/output (I/O) interface 704, and a communication assembly 705.

The processor 701 is configured to control the overall operation of the electronic device 700, so as to complete all or some of steps of the method for determining the academic impact described above. The memory 702 is configured to store various types of data to support the operation at the electronic device 700. These data may include, for example, instructions for any applications or methods operating on the electronic device 700, as well as application-related data, such as contact data, messages sent and received, pictures, audio, video, etc. The memory 702 may be implemented through any type of volatile or non-volatile memory apparatus or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or optical disk. The multimedia assembly 703 may include a screen and an audio assembly. The screen may be a touch screen, for example, and the audio assembly is configured to output and/or input an audio signal. For example, the audio assembly may include a microphone for receiving an external audio signal. The received audio signal may be further stored in memory 702 or sent through communication assembly 705. The audio assembly further includes at least one speaker for outputting the audio signal. The I/O interface 704 provides an interface between the processor 701 and other interface modules such as a keyboard, mouse, and button. These buttons may be virtual or physical buttons. The communication assembly 705 is configured for communication between the electronic device 700 and other apparatuses in a wired or wireless mode. Wireless communication, such as wireless fidelity (Wi-Fi), Bluetooth, near field communication (NFC), 2G, 3G, 4G, narrow band Internet of Things (NB-IoT), enhanced machine-type communication (eMTC), or other 5G, or their combination is not limited here. Accordingly, the communication assembly 705 may include: a Wi-Fi module, a Bluetooth module, a NFC module, etc.

In an example, the electronic device 700 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or the like for executing the method for determining an academic impact described above.

In another example, further provided is a computer-readable storage medium including a program instruction, where the program instruction implements steps of the method for determining the academic impact described above when executed by a processor. For example, the computer-readable storage medium may be the memory 702 including a program instruction described above, where the instruction described above may be executed by the processor 701 of the electronic device 700 so as to complete the method for determining the academic impact described above.

In another example, further provided is a computer program product. The computer program product includes a computer program executable by a programmable device, and the computer program has a code portion for executing the method for determining the academic impact described above when the code portion is executed by the programmable device.

The examples of the disclosure are described in detail above with reference to the accompanying drawings. However, the disclosure is not limited to specific details of the examples described above. Within the scope of the technical concept of the disclosure, various simple modifications can be made to the technical solution of the disclosure, and these simple modifications all fall within the scope of protection of the disclosure.

Moreover, it should also be noted that various particular technical features described in the examples described above can be combined in any suitable mode without contradiction. In order to avoid unnecessary repetition, various possible combinations are not further described in the disclosure.

In addition, various different examples of the disclosure can also be combined randomly, without deviating from the idea of the disclosure, and should also be regarded as contents disclosed in the disclosure.

What is claimed is:

1. A computer-implemented method for determining an academic impact, comprising:
    pre-processing a citing paper to obtain pre-processed data, wherein the citing paper refers to a paper citing a reference, and the pre-processed data comprises reference numbers of reference papers in a reference list of the citing paper, titles of the reference papers, authors of the reference papers, publication years of the reference papers, overlap between the authors of the reference papers and authors of the citing paper, identifier of a sentence in the citing paper, category of a section in the citing paper, a number of citations of the reference papers in the citing paper, texts of sentences containing the reference numbers in the citing paper, related sentences previous to the sentences containing the reference numbers, related sentences behind to the sentences containing the reference numbers, and sentiment of the citing paper towards the reference papers;
    determining a category of an impact, on the citing paper, of each reference paper and ranking of contribution, to the citing paper, of each reference paper, according to the pre-processed data;
    determining a local influential factor, on the citing paper, of each reference paper, according to the category of the impact and the ranking of the contribution of each reference paper; and
    determining a global influential factor of each reference paper according to a global influential factor of the citing paper and the local influential factor, wherein the global influential factor is applied to effectively evaluate true academic impacts of publications;
    wherein pre-processing the citing paper to obtain the pre-processed data comprises:
    determining a title of the citing paper, an author of the citing paper, a publication year of the citing paper, the reference numbers of the reference papers in the reference list of the citing paper, titles of the reference papers, authors of the reference papers, publication years of the reference papers, and citation markers in the citing paper, by parsing the citing paper;
    segmenting sentences and sections of the citing paper respectively, and determining identifiers of segmented sentences and categories of segmented sections;
    determining the texts of the sentences containing the reference numbers in the citing paper by positioning the citation markers in each segmented sentence;
    determining the number of citations of each reference paper in the citing paper by matching the positioned citation markers with the reference numbers; and
    determining the overlap between the authors of each reference paper and the authors of the citing paper according to a set of the authors of the citing paper and a set of the authors of each reference paper.

2. The computer-implemented method according to claim 1, wherein segmenting the sentences of the citing paper and determining the identifiers of segmented sentences, comprise:
    segmenting the sentences of the citing paper by using regular expression matching; and
    determining the identifiers of the segmented sentences according to orders of occurrence of the segmented sentences.

3. The computer-implemented method according to claim 1, wherein segmenting the sections of the citing paper and determining the categories of segmented sections, comprise:
    segmenting the sections of the citing paper and determining the categories of the segmented sections, based on keywords match.

4. The computer-implemented method according to claim 1, wherein pre-processing the citing paper to obtain the pre-processed data further comprises:
    iteratively determining sentences relevant to the sentences containing the reference numbers among sentences previous to and behind the sentences containing the reference numbers in the citing paper, by using a Bidirectional Encoder Representation From Transformers (BERT) classifier;
    determining sentences previous to the sentences containing the reference numbers and relevant to the sentences containing the reference numbers as related sentences previous to the sentences containing the reference numbers; and
    determining sentences behind to the sentences containing the reference numbers and relevant to the sentences containing the reference numbers as related sentences behind the sentences containing the reference numbers;
    wherein the BERT classifier is a classifier trained through a manually annotated data set, the manually annotated data set contains sentence pairs labeled as "related" or "irrelevant", and each sentence pair is generated from a single academic paper.

5. The computer-implemented method according to claim 4, further comprising: aborting an iteration of the BERT classifier in response to any one of the following iteration abortion conditions being satisfied:
the BERT classifier determines that there are sentences irrelevant to the sentences containing the reference numbers; or
a sentence being determined whether to be relevant to the sentences containing the reference numbers is not positioned in a same paragraph with or not and the sentences containing the reference numbers.

6. The computer-implemented method according to claim 1, wherein determining the category of the impact, on the citing paper, of each reference paper according to the pre-processed data comprises:
determining the category of the impact, on the citing paper, of each reference paper by a pre-trained classifier according to the pre-processed data, wherein the category of the impact includes the citing paper being highly impacted by the reference papers, the citing paper using work in the reference papers, the citing paper and the reference papers being related work, and the citing paper having negative sentiment towards the reference papers.

7. The computer-implemented method according to claim 1,
wherein determining the local influential factor, on the citing paper, of each reference paper, according to the category of the impact and the ranking of the contribution of each reference paper, comprises:
calculating contribution value of each reference paper according to the category of the impact and the ranking of the contribution of each reference paper, and obtaining the local influential factor of each reference paper by normalizing the contribution value to [0, 1].

8. The computer-implemented method according to claim 1, further comprising:
determining contribution, of a scholar of which an academic impact is to be analyzed, to each paper published by the scholar; and
determining an academic influential factor of the scholar based on the contribution, to each paper published by the scholar, of the scholar and the global influential factor of each paper.

9. A non-transitory computer-readable storage medium storing a computer program, wherein the computer program when executed by a processor cause the processor to:
pre-process a citing paper to obtain pre-processed data, wherein the citing paper refers to a paper citing a reference, and the pre-processed data comprises reference numbers of reference papers in a reference list of the citing paper, titles of the reference papers, authors of the reference papers, publication years of the reference papers, overlap between the authors of the reference papers and authors of the citing paper, identifier of a sentence in the citing paper, category of a section in the citing paper, a number of citations of the reference papers in the citing paper, texts of sentences containing the reference numbers in the citing paper, related sentences previous to the sentences containing the reference numbers, related sentences behind to the sentences containing the reference numbers, and sentiment of the citing paper towards the reference papers;
determine a category of an impact, on the citing paper, of each reference paper and ranking of contribution, to the citing paper, of each reference paper, according to the pre-processed data;
determine a local influential factor, on the citing paper, of each reference paper, according to the category of the impact and the ranking of the contribution of each reference paper; and
determine a global influential factor of each reference paper according to a global influential factor of the citing paper and the local influential factor, wherein the global influential factor is applied to effectively evaluate true academic impacts of publications;
wherein pre-processing the citing paper to obtain the pre-processed data comprises:
determining a title of the citing paper, an author of the citing paper, a publication year of the citing paper, the reference numbers of the reference papers in the reference list of the citing paper, titles of the reference papers, authors of the reference papers, publication years of the reference papers, and citation markers in the citing paper, by parsing the citing paper;
segmenting sentences and sections of the citing paper respectively, and determining identifiers of segmented sentences and categories of segmented sections;
determining the texts of the sentences containing the reference numbers in the citing paper by positioning the citation markers in each segmented sentence;
determining the number of citations of each reference paper in the citing paper by matching the positioned citation markers with the reference numbers; and
determining the overlap between the authors of each reference paper and the authors of the citing paper according to a set of the authors of the citing paper and a set of the authors of each reference paper.

10. An electronic device, comprising:
a non-transitory computer-readable memory storing a computer program; and
a processor configured to execute the computer program in the memory, to:
pre-process a citing paper to obtain pre-processed data, wherein the citing paper refers to a paper citing a reference, and the pre-processed data comprises reference numbers of reference papers in a reference list of the citing paper, titles of the reference papers, authors of the reference papers, publication years of the reference papers, overlap between the authors of the reference papers and authors of the citing paper, identifier of a sentence in the citing paper, category of a section in the citing paper, a number of citations of the reference papers in the citing paper, texts of sentences containing the reference numbers in the citing paper, related sentences previous to the sentences containing the reference numbers, related sentences behind to the sentences containing the reference numbers, and sentiment of the citing paper towards the reference papers;
determine a category of an impact, on the citing paper, of each reference paper and ranking of contribution, to the citing paper, of each reference paper, according to the pre-processed data;
determine a local influential factor, on the citing paper, of each reference paper, according to the category of the impact and the ranking of the contribution of each reference paper; and
determine a global influential factor of each reference paper according to a global influential factor of the citing paper and the local influential factor, wherein the global influential factor is applied to effectively evaluate true academic impacts of publications;

wherein the processor is further configured to:
determine a title of the citing paper, an author of the citing paper, a publication year of the citing paper, the reference numbers of the reference papers in the reference list of the citing paper, titles of the reference papers, authors of the reference papers, publication years of the reference papers, and citation markers in the citing paper, by parsing the citing paper;
segment sentences and sections of the citing paper respectively, and determine identifiers of segmented sentences and categories of segmented sections;
determine the texts of the sentences containing the reference numbers in the citing paper by positioning the citation markers in each segmented sentence;
determine the number of citations of each reference paper in the citing paper by matching the positioned citation markers with the reference numbers; and
determine the overlap between the authors of each reference paper and the authors of the citing paper according to a set of the authors of the citing paper and a set of the authors of each reference paper.

11. The electronic device according to claim 10, wherein the processor is further configured to:
segment the sentences of the citing paper by using regular expression matching; and
determine the identifiers of the segmented sentences according to appearing order of the segmented sentences.

12. The electronic device according to claim 10, wherein the processor is further configured to:
segment the sections of the citing paper and determine the categories of the segmented sections, based on keywords match.

13. The electronic device according to claim 10, wherein the processor is further configured to:
iteratively determine sentences relevant to the sentences containing the reference numbers among sentences previous to and behind the sentences containing the reference numbers in the citing paper, by using a Bidirectional Encoder Representation From Transformers (BERT) classifier;
determine sentences previous to the sentences containing the reference numbers and relevant to the sentences containing the reference numbers as related sentences previous to the sentences containing the reference numbers; and
determine sentences behind the sentences containing the reference numbers and relevant to the sentences containing the reference numbers as related sentences behind the sentences containing the reference numbers;
wherein the BERT classifier is a classifier trained through a manually annotated data set, the manually annotated data set contains sentence pairs labeled as "related" or "irrelevant", and each sentence pair is generated from a single academic paper.

14. The electronic device according to claim 13, wherein the processor is further configured to: abort an iteration of the BERT classifier in response to any one of the following iteration abortion conditions being satisfied:
the BERT classifier determines that there are sentences irrelevant to the sentences containing the reference numbers; and
a sentence being determined to be relevant to the sentence containing the reference numbers or not and the sentence containing the reference numbers are not positioned in a same paragraph.

15. The electronic device according to claim 10, wherein the processor is further configured to:
determine the category of the impact, on the citing paper, of each reference paper by a pre-trained classifier according to the pre-processed data, wherein the category of the impact includes the citing paper being highly impacted by the reference papers, the citing paper using work in the reference papers, the citing paper and the reference papers being related work, and the citing paper having negative sentiment towards the reference papers.

16. The electronic device according to claim 10, wherein the processor is further configured to:
calculate contribution value of each reference paper according to the category of the impact and the ranking of the contribution of each reference paper, and obtain the local influential factor of each reference paper by normalizing the contribution value to [0, 1].

17. The electronic device according to claim 10, wherein the processor is further configured to:
determine contribution, of a scholar of which an academic impact is to be analyzed, to each paper published by the scholar; and
determine an academic influential factor of the scholar based on the contribution, to each paper published by the scholar, of the scholar and the global influential factor of each paper.

\* \* \* \* \*